March 5, 1957  T. A. SHABARICK  2,783,875
FISHING TACKLE RECEPTACLE
Filed July 11, 1955
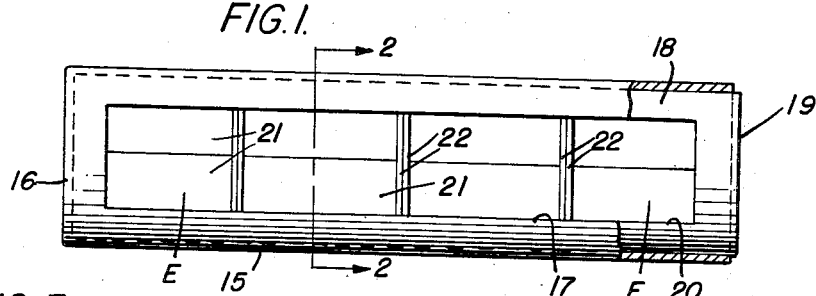
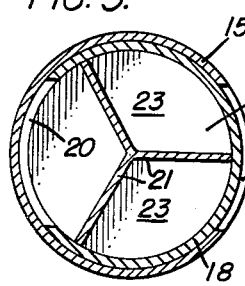
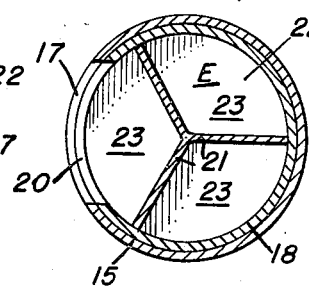
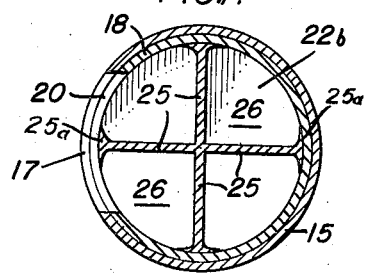
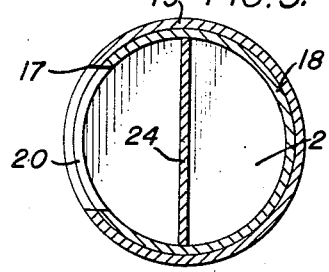
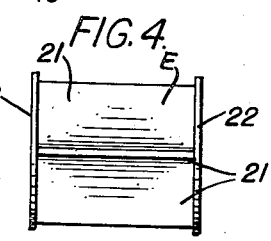
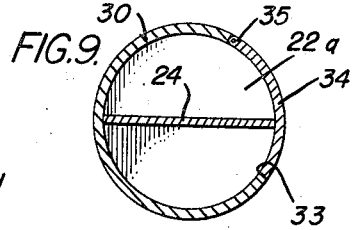
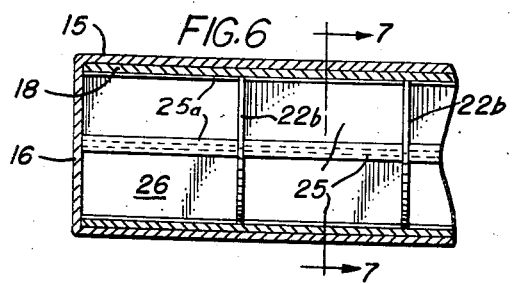
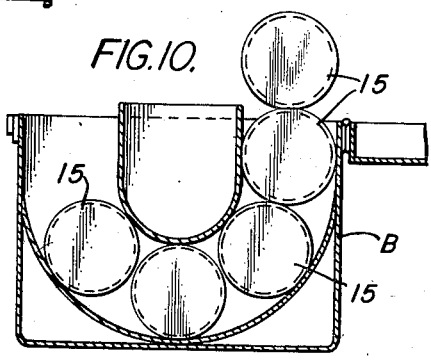
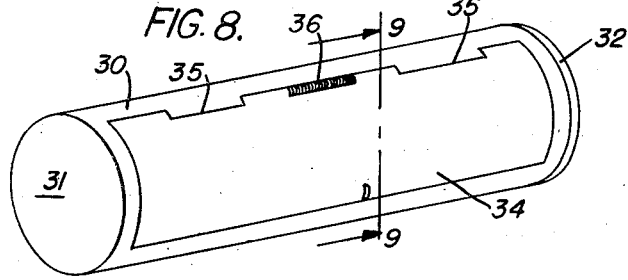
TONY A. SHABARICK
INVENTOR.
BY
Attorney United States Patent Office 2,783,875
Patented Mar. 5, 1957

2,783,875
FISHING TACKLE RECEPTACLE
Tony A. Shabarick, Los Angeles, Calif.
Application July 11, 1955, Serial No. 521,253
7 Claims. (Cl. 206—16)

My invention relates to portable receptacles for fishing tackle, and it has for a purpose the provision of a receptacle of elongated tubular form having therein a plurality of units mounted for rotation independently one of the other, and each unit constructed to provide a plurality of compartments in which fishing tackle of various types are adapted to be stored, and which compartments open to the periphery of the receptacle so that by rotation of any one preselected unit a preselected compartment thereof can be brought into registry with a peripheral opening in the receptacle to gain access to the contents of that compartment.

It is also a purpose of my invention to provide a fishing tackle receptacle having two tubular members telescoped one within the other, and each provided with peripheral openings that can, by relative rotation of the members, be brought into registration with each other to gain access to the inner member, and a plurality of compartment-forming units arranged in end-to-end relation longitudinally in the inner member and fitted therein for individual rotation so that when the openings in the two members are brought into registry, access can be had to any preselected unit for rotation thereof to bring any preselected compartment of that unit into registry with the member openings to gain access to the contents thereof. Conversely, when the two openings of the members are out of register, the receptacle is completely closed to maintain in their respective compartments the various types of fishing tackle stored therein against loss or intermixing one with the other.

I will describe only four forms of receptacles for fishing tackle each embodying my invention and will then point out the novel features thereof in claims.

In the accompanying drawings:

Fig. 1 is a view showing in front elevation, with a portion thereof in section, one form of receptacle embodying my invention.

Fig. 2 is a vertical sectional view taken on the line 2—2 of Fig. 1.

Fig. 3 is a view similar to Fig. 2 but distinguished therefrom in showing the two members of the receptacle turned relatively to close the receptacle.

Fig. 4 is an elevational view on a reduced scale of one of the compartment-forming units shown in Fig. 1.

Fig. 5 is a view similar to Fig. 2 with compartment-forming units therein of a different structure from that shown in Fig. 2.

Fig. 6 is a fragmentary longitudinal sectional view of the receptacle of Fig. 1 but showing another form of compartment-forming unit therein.

Fig. 7 is a vertical sectional view taken on the line 7—7 of Fig. 6.

Fig. 8 is a perspective view on a reduced scale showing another form of receptacle embodying my invention.

Fig. 9 is a vertical sectional view taken on the line 9—9 of Fig. 8.

Fig. 10 is a vertical sectional view of a tackle box of the form disclosed in my pending application Serial No. 457,168, filed September 20, 1954 and containing a plurality of receptacles either in the form shown in Fig. 1 or that shown in Fig. 8.

Referring more particularly to the drawings and to the form of receptacle shown in Figs. 1, 2 and 3, it comprises an outer member 15 constructed of plastic or metal and of elongated tubular form, with one end open and the other closed by a wall 16, and the cylindrical wall of the member formed with an elongated opening 17. Telescopically fitted in the outer member 15 so that it is frictionally held against longitudinal displacement therefrom and yet can be rotated relative thereto, is an elongated inner member 18. The inner end of this member 18 is open but its outer end is closed by wall 19, and the circular wall of such member is provided with an opening 20 preferably of the same dimensions as the opening 17 of the outer member. This inner member may be constructed of the same material as the outer member.

The inner member 18 is adapted to contain a plurality of compartment-forming units or elements, each indicated at E, arranged in end-to-end relation and fitted therein so that they can be rotated about the major axis of the receptacle independently of each other. Each unit E comprises three partitions 21 fixed in radial relation one to the other, and disks 22 fixed on opposite ends of the partitions.

These disks 22 and partitions 21 have an outside diameter which permits of free rotation of the units in the inner member 18, and as the several units are arranged within the member the disks 22 are in confronting relation one to the other. Manifestly, the partitions provide sector-shaped compartments 23 therebetween which open at the periphery of the unit, while the disks close the compartments at the ends of the unit to separate them from the compartments of adjacent units. The compartments of any one unit are adapted to contain fishing tackle of one description, say, for example, flies, of various forms, while the compartments of the other units are adapted to contain other types of fishing tackle. Thus it will be understood that when the units are arranged within the inner member 18 as has been described, the fishing tackle contained in the compartments of any one unit are prevented from escaping to adjacent units.

In practice, the receptacle as a whole is designed to be constructed so that it can be readily carried in the hand or in the pocket of the user, and preferably the receptacle is of such dimensions that a plurality thereof can be contained in a tackle box B of the construction shown in Fig. 10, and as embodied in my copending application hereinbefore referred to, so that they may be singly ejected from the tackle box for use as required.

In the use of the receptable the two members 15 and 18 normally occupy the relative circumferential positions shown in Fig. 3 so that the opening 20 of the inner member is out of registration with the opening 17 of the outer member, and thus all compartments of all units E are completely closed against loss of their contents or intermixing of the contents of one unit with those of the other. To gain access to any one particular compartment of any one preselected unit, it is only necessary to rotate the members 15 and 18 relatively from the position shown in Fig. 3 to that shown in Fig. 2 whereby, the openings 17 and 20 are brought into registration with each other and whereupon, the particular unit E can be rotated independently of the others, to bring the mouth of the preselected compartment into registration with the openings, thus permitting access to the contents of that compartment.

The construction of the compartment-forming units may vary from that of the unit E as provided with three partitions, to the form shown in Fig. 5 in which only a single partition 24 is employed and which extends diametrically of and is fixed to disks 22a at the ends thereof. Thus the unit is divided into only two compartments of semi-circular form rather than sector form.

In Figs. 6 and 7, the compartment-forming units are each constructed with four radially arranged partitions 25 to provide four compartments 26 of sector form which are closed at their confronting ends by disks 22b but which, as distinguished from the preceding forms of units, are not secured to the partitions but simply mounted in the inner member between the units. Also, to facilitate turning of the units in the receptacle, the outer longitudinal edges of the partitions are formed with rounded flanges 25a.

Referring now to Figs. 8 and 9, I have here shown a fishing tackle receptacle which is made up of a single tube 30 one end of which is permanently closed by a wall 31 while the other end is closed by a cap 32. The tube is formed with a longitudinally extending opening 33 normally closed by a door 34 hinged at 35 and urged to closed position by spring 36.

It will be understood that in this form of my invention one or more compartment-forming units are contained in the tube so that they are arranged in end-to-end relation therein and insertable before the cap 32 is applied even though in Fig. 9 is shown a unit embodying a single partition 24.

Although I have herein shown and described only four forms of receptacles for fishing tackle each embodying my invention, it is to be understood that various changes and modifications may be made without departing from the spirit of the invention and the spirit and scope of the appended claims.

What I claim is:

1. A receptacle for fishing tackle; including: an elongated tubular body closed at its ends and formed with a peripheral opening; a plurality of separate compartment-forming units slidably arranged in end-to-end relation longitudinally in said body, each of said units having radial partitions forming a plurality of sector-shaped compartments opening to the periphery of said body, said units being individually rotatable in said body to bring any preselected compartment of any one unit into registry with the body opening; and means on said body movable to close the opening therein.

2. A receptacle for fishing tackle; including: an outer tubular member closed at one end, and having a peripheral opening; an inner tubular member of substantially the same length as the outer member telescopically and rotatably fitted in the outer member, and having an open inner end opposing and closed by the closed end of the outer member and having a closed outer end and a peripheral opening of substantially the same size as the opening of the outer member which, by relative rotation of said members, can be moved into and out of registration with the opening in the outer member; and a circular element having circumferentially spaced compartments therein opening to the periphery thereof, said element being rotatably and axially slidably fitted in the inner member so that any one of the compartments can be brought into registry with the opening in the inner member.

3. A receptacle for fishing tackle; including an outer tubular member closed at one end, and having a peripheral opening; an inner tubular member telescopically and rotatably fitted in the outer member, and having an open inner end opposing and closed by the closed end of the outer member and having a closed outer end, and a peripheral opening which, by relative rotation of said members, can be moved into and out of registration with the opening in the outer member; and a plurality of separate compartment-forming units slidably arranged in end-to-end relation in the inner member, each of said units having circumferentially spaced compartments therein opening to the periphery thereof, and said units being fitted in the inner member for individual rotation so that any one of the compartments of any one unit can be brought into registry with the opening in the inner member.

4. A receptacle for fishing tackle; including: an outer tubular member closed at one end, and having a peripheral opening; an inner tubular member of substantially the same length as the outer member telescopically and rotatably fitted in the outer member, and having an open inner end opposing and closed by the closed end of the outer member and having a closed outer end, and a peripheral opening of substantially the same size as the opening of the outer member which, by relative rotation of said members, can be moved into and out of registration with the opening in the outer member; and a plurality of separate compartment-forming units slidably arranged in end-to-end relation in the inner member; each of said units comprising a pair of disks and radial partitions secured between and to the disks and forming therewith a plurality of sector-shaped compartments open at the periphery of the unit, and said disks being rotatably fitted in the inner member for rotation to bring any one of the compartments thereof in registry with the opening in the inner member.

5. A receptacle for fishing tackle; including an outer tubular member closed at one end, and having a peripheral opening; an inner tubular member of substantially the same length as the outer member telescopically and rotatably fitted in the outer member, and having an open inner end opposing and closed by the closed end of the outer member and having a closed outer end, and a peripheral opening of substantially the same size as the opening of the outer member which, by relative rotation of said members, can be moved into and out of registration with the opening in the outer member; and a plurality of compartment-forming units slidably arranged in end-to-end relation in the inner member; each of said units comprising a disk and radial partitions fixed at one end to one side of the disk and secured to each other to form intervening compartments open at the periphery of the unit, the disk being rotatably fitted in the inner member so that any one of said compartments can be brought into registry with the opening in the inner member.

6. A receptacle for fishing tackle; including: an outer tubular member closed at one end, and having a peripheral opening; an inner tubular member of substantially the same length as the outer member telescopically and rotatably fitted in the outer member, and having an open inner end opposing and closed by the closed end of the outer member and having a closed outer end, and a peripheral opening of substantially the same size as the opening of the outer member which, by relative rotation of said members, can be moved into and out of registration with the opening in the outer member; and a plurality of compartment-forming units arranged in end-to-end relation in the inner member; each of said units comprising radial partitions forming intervening compartments and the partitions having rounded longitudinal outer edges and a disk at one end of the partitions for closing the respective ends of the compartments; said partitions and disk being rotatable in the inner member to bring any one of the compartments into registry with the opening in the inner member.

7. A compartmented article carrier comprising an elongate cylinder closed at one end, a freely removable means closing the other end of the cylinder, the cylinder having a longitudinal side opening, a compartment forming elongate unit of cylindrical form disposed within the cylinder and embodying a partitioning wall having radially directed edges in contact with the surface of the surrounding wall of the cylinder and dividing the cylinder in at least two radially opening compartments, said unit being independent of and entirely separate from the cylinder and adapted to be freely slidably inserted thereinto and removed therefrom through the said other end of the cylinder, the unit being freely rotatable in the cylinder for selectively bringing the compartments into registry with said side opening of the cylinder, and an elongate transversely curved closure means carried by the cylinder outside of and independent from the compartment forming unit and movable relative to the cylinder to open and close said side wall opening.

References Cited in the file of this patent

UNITED STATES PATENTS

| | | |
|---|---|---|
| 1,213,586 | Cabell | Jan. 23, 1917 |
| 2,051,136 | Dormire | Aug. 18, 1936 |
| 2,412,332 | Hansen | Dec. 10, 1946 |
| 2,478,621 | Attula | Aug. 9, 1949 |